United States Patent
Chou et al.

(10) Patent No.: US 8,322,110 B2
(45) Date of Patent: Dec. 4, 2012

(54) TRIM FLAP-LIKE CLOSEOUT EDGE ATTACHMENT

(75) Inventors: ShuiFang Chou, Troy, MI (US); Jennifer Macalaguin, Southlake, TX (US); James M. Park, Huntington Woods, MI (US); Richard Louis Hamilton, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 12/392,279

(22) Filed: Feb. 25, 2009

(65) Prior Publication Data

US 2010/0212252 A1 Aug. 26, 2010

(51) Int. Cl.
*E04C 2/38* (2006.01)
(52) U.S. Cl. ......... 52/716.5; 52/718.01; 52/312; 24/289
(58) Field of Classification Search .................. 52/716.5, 52/716.6, 716.7, 718.01, 718.04, 718.05, 52/718.06, 312; 24/289–297
See application file for complete search history.

(56) References Cited

U.S. PATENT DOCUMENTS

| | | | |
|---|---|---|---|
| 4,388,355 A * | 6/1983 | Ikemizu | 428/31 |
| 4,564,232 A * | 1/1986 | Fujimori et al. | 296/146.5 |
| 4,698,882 A | 10/1987 | Lang | |
| 4,911,495 A * | 3/1990 | Haga et al. | 296/209 |
| 5,202,172 A | 4/1993 | Graf | |
| 5,947,547 A * | 9/1999 | Deeks et al. | 296/146.7 |
| 6,095,594 A * | 8/2000 | Riddle et al. | 296/191 |
| 6,179,359 B1 * | 1/2001 | Clauson et al. | 296/39.1 |
| 6,276,109 B1 | 8/2001 | Hingorani et al. | |
| 6,511,108 B1 | 1/2003 | Roessner, III et al. | |
| 6,722,730 B2 * | 4/2004 | Lydan et al. | 296/191 |
| 6,811,210 B2 * | 11/2004 | Granger et al. | 296/191 |
| 7,168,757 B2 * | 1/2007 | Futatsuhashi | 296/209 |
| 7,178,205 B2 | 2/2007 | Nessel et al. | |
| 7,179,013 B2 | 2/2007 | Benedetti | |
| 7,364,382 B2 * | 4/2008 | Benedetti et al. | 403/388 |
| 7,600,809 B2 * | 10/2009 | Boggess et al. | 296/191 |
| 7,627,973 B2 * | 12/2009 | Lin et al. | 40/797 |
| 2003/0213105 A1 | 11/2003 | Bednarski | |
| 2006/0261632 A1 | 11/2006 | Twork | |
| 2006/0267381 A1 * | 11/2006 | Cave et al. | 296/209 |

* cited by examiner

*Primary Examiner* — Branon Painter
(74) *Attorney, Agent, or Firm* — James Dottavio; Price Heneveld LLP (57) ABSTRACT

A vehicle trim component includes a trim body, with a primary fastener extending from the trim body. The primary fastener includes a first end and a second end. The first end includes a push clip head that is configured to substantially fit and project through an aperture in the vehicle panel. The second end is connected to the trim body. The secondary fastener is rotatably connected to the trim body by a living hinge and is positioned to engage the vehicle panel at an edge portion of the vehicle panel.

20 Claims, 8 Drawing Sheets

TRIM FLAP-LIKE CLOSEOUT EDGE ATTACHMENT

FIELD OF THE INVENTION

The present invention generally relates to the attachment of a vehicle trim component to a vehicle body, and more particularly securement of the trim component to the vehicle.

BACKGROUND OF THE INVENTION

A motor vehicle body typically includes panels where the vertical sides of the body intersect the horizontal floor of the body. These panels are exposed to the exterior of the vehicle and are often made of unfinished materials. The vehicle panels are commonly covered or shrouded by trim components that alleviate the unsightliness of the panels and provide an aesthetically pleasing look to the vehicle.

Typically, a series of apertures are manufactured into the paneling, thereby providing trim components the ability to be secured to the vehicle body with screws or other fasteners using various methods. The series of apertures is commonly found along the longitudinal direction at a position near the vertical center of the panel. However, securing at only one position along the longitudinal axis often causes excessive vibration, which leads to undesirable noise for occupants of the vehicle. To eliminate this problem, many panels have had additional apertures provided near the edge of the paneling to provide for further security and stability of the trim component. However, vehicle manufacturers frequently employ a pumpable sealer to seal gaps between the welded sheet metals of the vehicle body, in order to prevent water leakage into the passenger compartment. This sealer often leaks in positions near the edge of the paneling, thereby filling or clogging the surface of the fastener aperture. Filling or clogging makes attachment of the trim component difficult when using fasteners that project through holes at an edge portion of the vehicle panel. Accordingly, an apparatus is desired having the aforementioned advantages and solving and/or making improvements on the aforementioned disadvantages.

SUMMARY OF THE PRESENT INVENTION

One aspect of the present invention is to provide a vehicle trim component for a vehicle comprising a trim body. Further included is a primary fastener that includes a projection that extends from the trim body and includes a first end and a second end, wherein the first end projects through an aperture in a vehicle panel and the second end is connected to the trim body. A secondary fastener includes a retention flap rotatably connected to the trim body by a living hinge. The flap has an engagement head that engages an edge portion of the vehicle panel to securely attach the trim component to the vehicle.

Another aspect of the present invention is to provide a vehicle trim component comprising a trim body. Also included is a primary fastener extending from the trim body. The primary fastener includes a first end and a second end. The first end includes a push clip head that is configured to substantially fit and project through an aperture in a vehicle panel. The second end is connected to the trim body. A secondary fastener is rotatably connected to the trim body by a living hinge and is positioned to engage the vehicle panel at an edge portion of the vehicle panel.

According to a further aspect of the present invention, there is provided a method of covering a vehicle panel. The method involves forming an aperture in the vehicle panel. The method also involves providing a vehicle trim component for attachment to the vehicle panel, wherein the trim component includes a trim body, a primary fastener extending from the trim body. The primary fastener includes a first end and a second end. The first end has a push clip head that is configured to substantially fit and project through an aperture on a vehicle panel, while the second end is connected to the trim component. The trim component is then attached to the vehicle panel by inserting the primary fastener within the aperture in the vehicle panel. The method further includes the step of attaching a secondary fastener rotatably connected to the trim body by a living hinge, with the secondary fastener positioned to engage the vehicle panel at an edge portion of the vehicle panel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
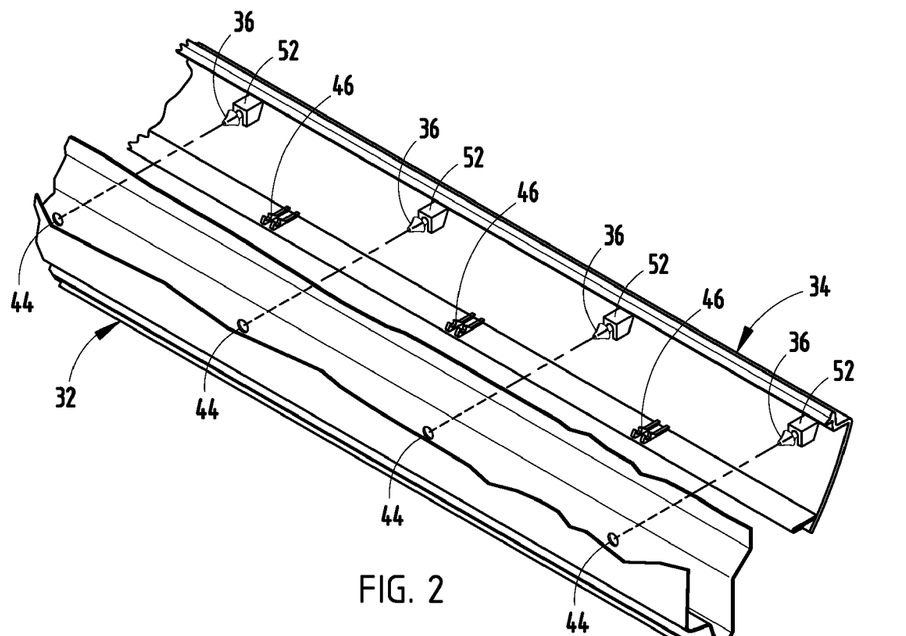
FIG. 2 is a top exploded assembly view of a vehicle panel being covered by a trim component according to a first embodiment.
Figure 2A:
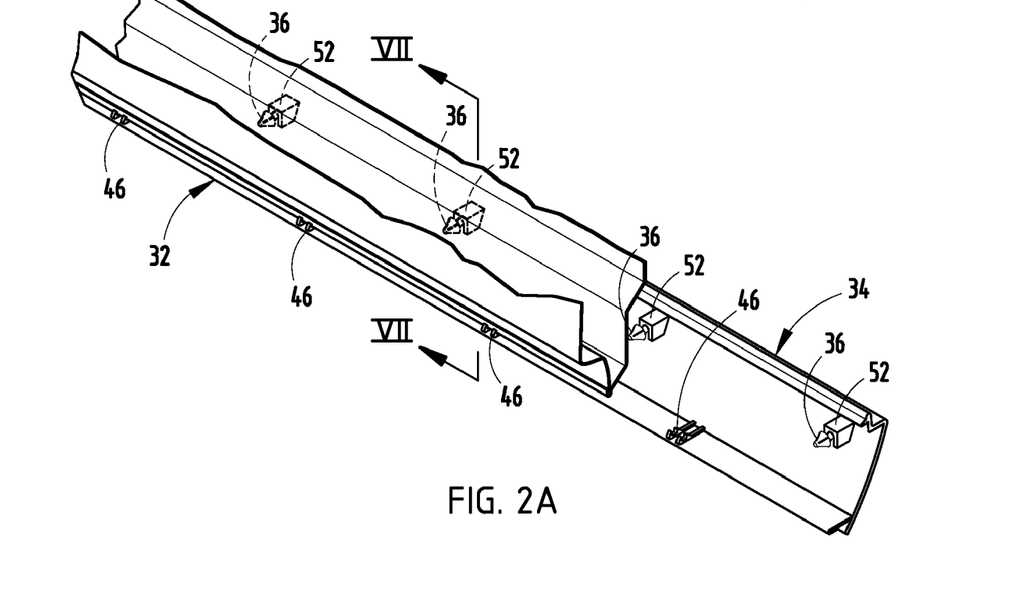
FIG. 2A is a top perspective view of the trim component shown in FIG. 2 aligned prior to engagement and covering of the vehicle panel.
Figure 3:
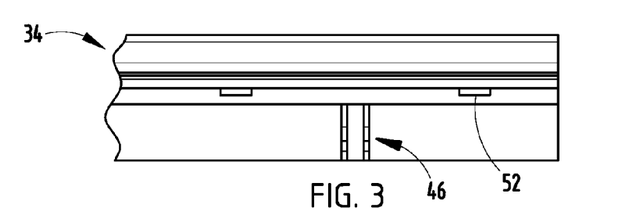
FIG. 3 is an elevational top view of the trim component shown in FIG. 2.
Figure 4:
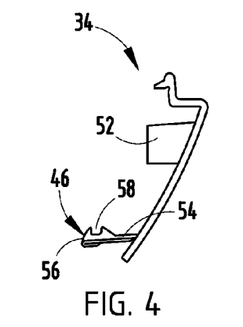
FIG. 4 is an elevational end view of the trim component shown in FIG. 2.
Figure 5:
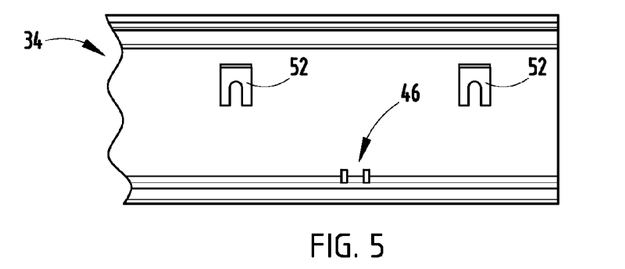
FIG. 5 is an elevational front view of the trim component shown in FIG. 2.
Figure 6:
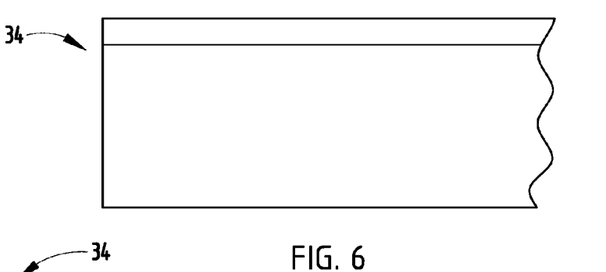
FIG. 6 is an elevational rear view of the trim component shown in FIG. 2.

For purposes of description herein, the terms "upper," "lower," "right," "left," "rear," "front," "vertical," "horizontal," and derivatives thereof shall relate to the trim component attachment to the vehicle body as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
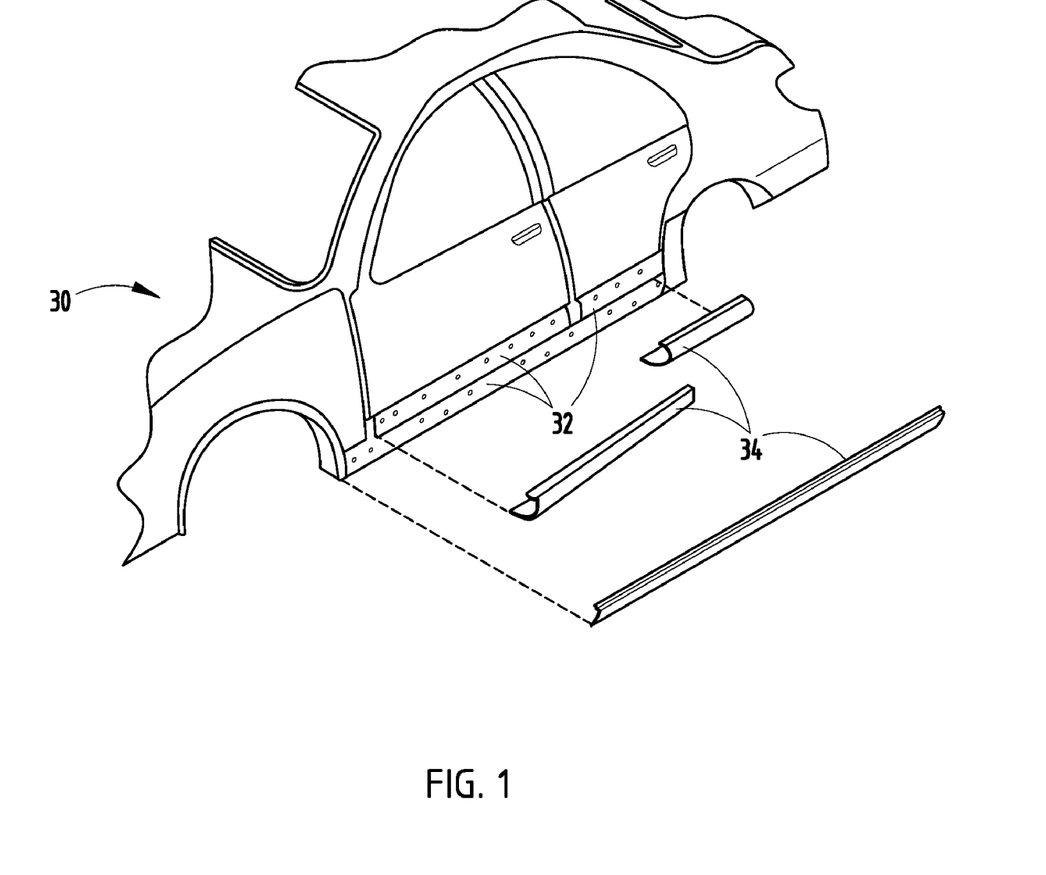
FIG. 1 is a side perspective view of a vehicle having trim components shown in exploded view installed on vehicle paneling.

Referring to FIG. 1, a portion of the body of a vehicle 30 having exposed body paneling 32 is generally illustrated. The vehicle 30 may be a wheeled automotive vehicle according to one embodiment. Also illustrated are various vehicle trim components 34, shown exploded from the body paneling 32 prior to attachment, which cover or shroud the unfinished portions of the body paneling 32. The trim components 34 may be configured to attach to the body paneling 30 according to one of the embodiments disclosed herein.

The vehicle trim component 34 is shown in FIGS. 2-8 configured to attach to a body panel 32 of vehicle 30 according to a first embodiment. In the illustrated embodiment, the vehicle trim component 34 comprises a trim body 72, and a plurality of primary fasteners 36 connected to, and extending from, the trim body 72. The primary fasteners 36 each include a first end 38 and a second end 40. The first end 38 includes a push clip head 42 that is configured to substantially fit and project through an aperture 44 in a vehicle panel 32. The push clip head 42 has at least one resilient retention flap that is compressed when inserted through aperture 44 and expanded after insertion to prevent withdrawal of fastener 36 from panel 32. The second end 40 is connected to the trim body 72. A plurality of secondary fasteners 46 are rotatably connected to the trim body 72 along the lower edge. Each secondary fastener 46 has a living hinge 48 and is positioned to engage the vehicle panel 32 at an edge portion of the vehicle panel 32.

In the illustrated example, a vehicle trim component 34 has a series of housings 52 on the inner surface which hold primary fasteners 36, such as a push clip 42, that engage the vehicle panel 32 by being pressed through the apertures 44 of the vehicle panel 32. Each primary fastener 36 is a projection that extends from the trim body 72, with a head or prongs that are capable of being pushed through each aperture 44. Upon entry through the aperture 44, the push clip head 42 of primary fastener 36 expands, thereby preventing withdrawal of the primary fastener 36 from aperture 44 and holding the trim component 34 fastened to vehicle panel 32. To further secure the trim component 34 to the vehicle panel 32, the secondary fasteners 46 are located along the lower edge of the trim body 72. The secondary fasteners 46 are aligned to engage the vehicle panel 32 at a lower edge section of the vehicle panel 32. Attachment to an outer portion of the vehicle panel 32 avoids the problem of projecting through the lower portion of the vehicle base 32, where pumpable sealer 68 commonly clogs such apertures.

Figure 7:
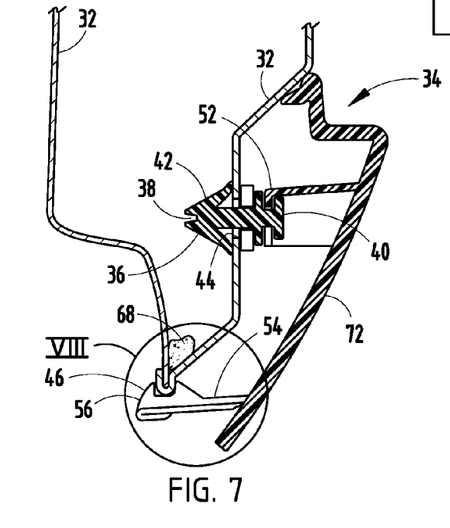
FIG. 7 is a cross-sectional view taken at line VII-VII of FIG. 2A showing the vehicle panel being covered by the trim component.
Figure 8:
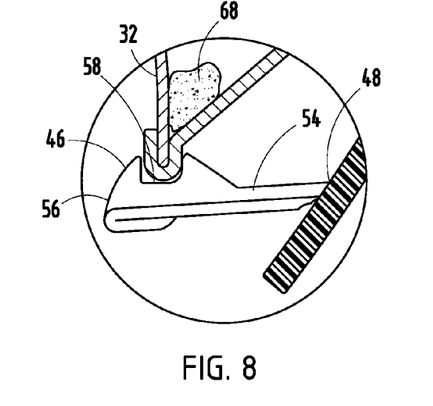
FIG. 8 is an enlarged view of section VIII of FIG. 7, further illustrating an engagement head of the trim component clipping to the edge of the vehicle panel.
Figure 9:
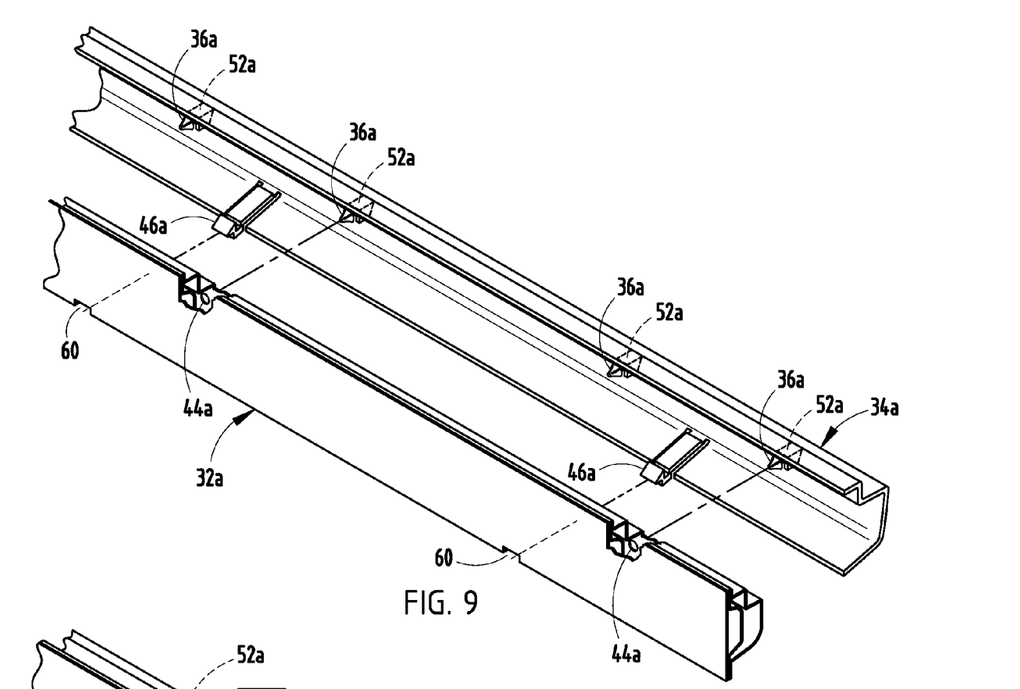
FIG. 9 is a top exploded assembly view of a vehicle panel being covered by a trim component according to a second embodiment.
Figure 9A:
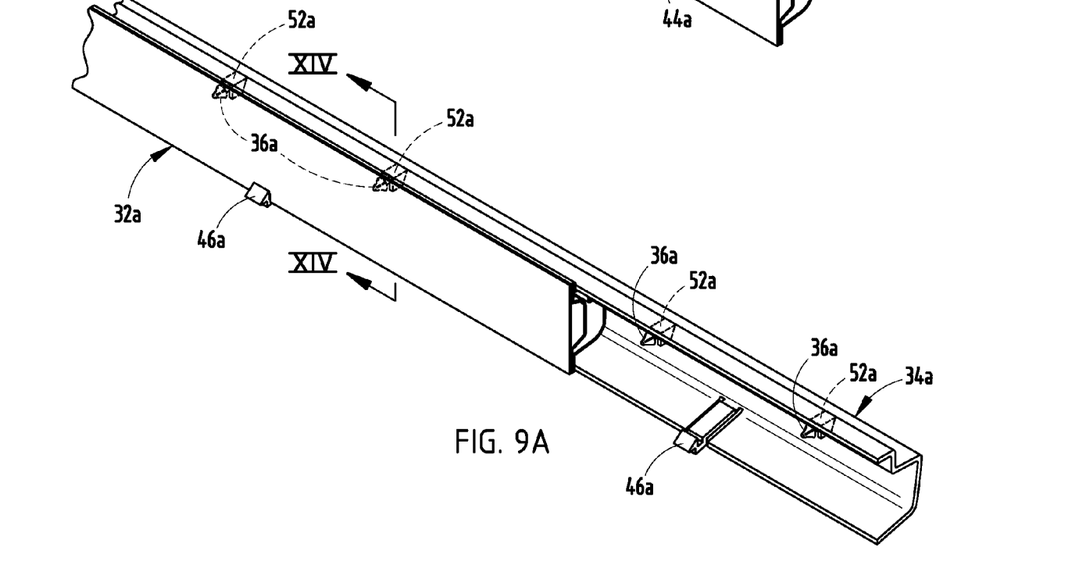
FIG. 9A is a top perspective view of a trim component shown in FIG. 9 aligned prior to engagement and covering of the vehicle panel.
Figures 10, 11, 12:
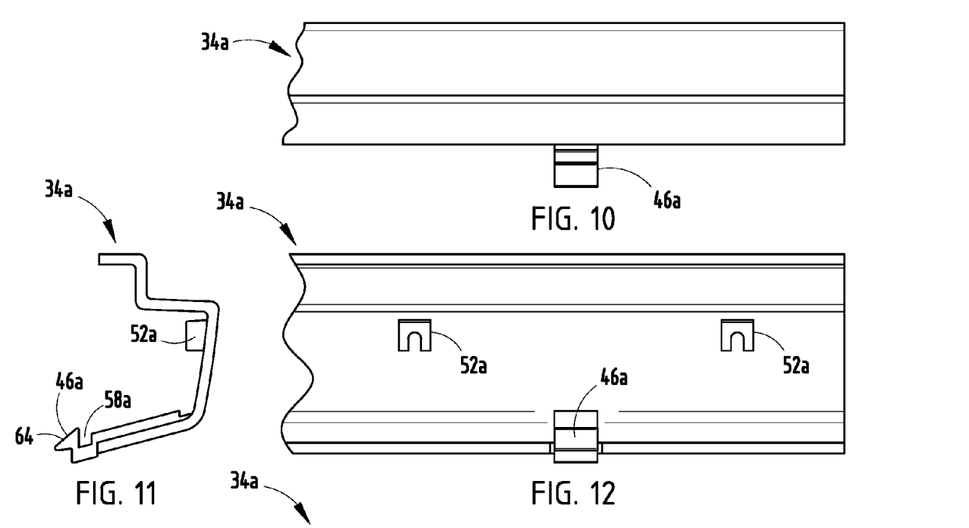
FIG. 10 is an elevational top view of the trim component shown in FIG. 9.
FIG. 11 is an elevational end view of the trim component shown in FIG. 9.
FIG. 12 is an elevational front view of the trim component shown in FIG. 9.

Each secondary fastener 46 includes a flap 54 that is rotatably connected to the trim body 72 and extends outwardly from the trim body 72, towards the panel 32. Each flap 54 contains an angled or rounded cam surface 56 that allows for an edge portion of the vehicle panel 32 to slide over the cam surface 56 of the flap 54. As the flap 54 engages panel 32, the cam surface 56 slides so as to bias the flap 54 to cause the flap 54 to rotate downward to accommodate engagement of the flap 54 to the panel 32. The flap 54 has an upstanding U-shaped channel 58 that receives and retains the bottom edge of panel 32 once the panel 32 passes over the cam surface 56. The flap 54 is made of a material that is capable of being deformed in the aforementioned manner, yet of sufficient resiliency to retain the original position of the flap 54 subsequent to complete passage of the panel 32 over the cam surface 56. An oppositely-configured surface is positioned closer to the trim component 34, thereby creating the upstanding U-channel 58 that retains the vehicle panel 32 upon entry into the channel 58. The channel 58 shape and dimensions are based on the shape and dimensions of the edge portion of the panel 32 and must accommodate the edge portion accordingly. FIG. 7 illustrates complete engagement of a trim component 34 to a vehicle panel 32 and FIG. 8 further illustrates the engagement of the secondary fastener 46. The additional security provided by the secondary fastener 46 ensures engagement of the trim component 34 to the vehicle panel 32 and reduces movement of the components relating to each other.

Referring to FIGS. 9-15, a vehicle trim component 34a is shown according to a second embodiment connected to a body panel 32a of a vehicle. The vehicle trim component 34a has a trim body 72a and primary fasteners 36a that connect to body panel 32a the same or similar to the primary fasteners 36 described in the first embodiment. Since vehicle trim component 34a is similar to the previously-described vehicle trim component 34 of the first embodiment, similar parts appearing in FIGS. 2-8 and FIGS. 9-15, respectively, are represented by the same corresponding reference number, except for the suffix "a" in the numerals of the latter.

In the illustrated second embodiment, the trim component 34a has a plurality of housings 52a and primary fasteners 36a, configured and aligned, similar to that of the previously-described vehicle trim component 34 of the first embodiment. The illustrated vehicle body panel 32a has notches 60 located along the lower edge of the panel 32a. The notches 60 extend upward from the bottom edge and are configured to receive and engage the secondary fasteners 46a of the trim component 34a.

Figures 13, 14, 15:
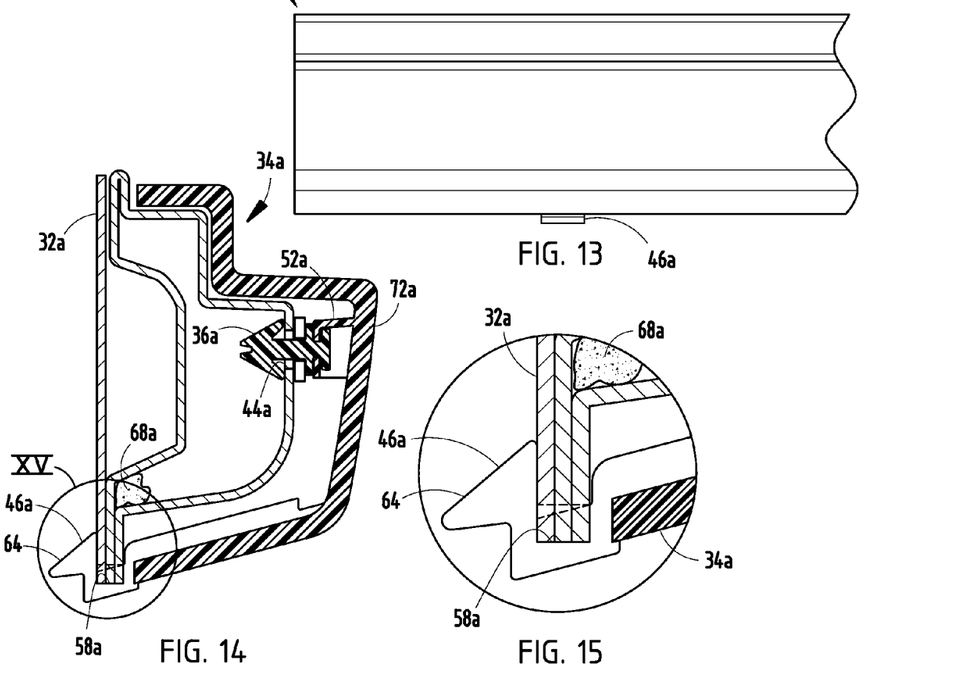
FIG. 13 is an elevational rear view of the trim component shown in FIG. 9.
FIG. 14 is a cross-sectional view taken at line XIV-XIV of FIG. 9A showing the vehicle panel being covered by a trim component.
FIG. 15 is an enlarged view of section XV of FIG. 14 further illustrating the engagement head of the trim component clipping to the edge of the vehicle panel.
Figure 16:
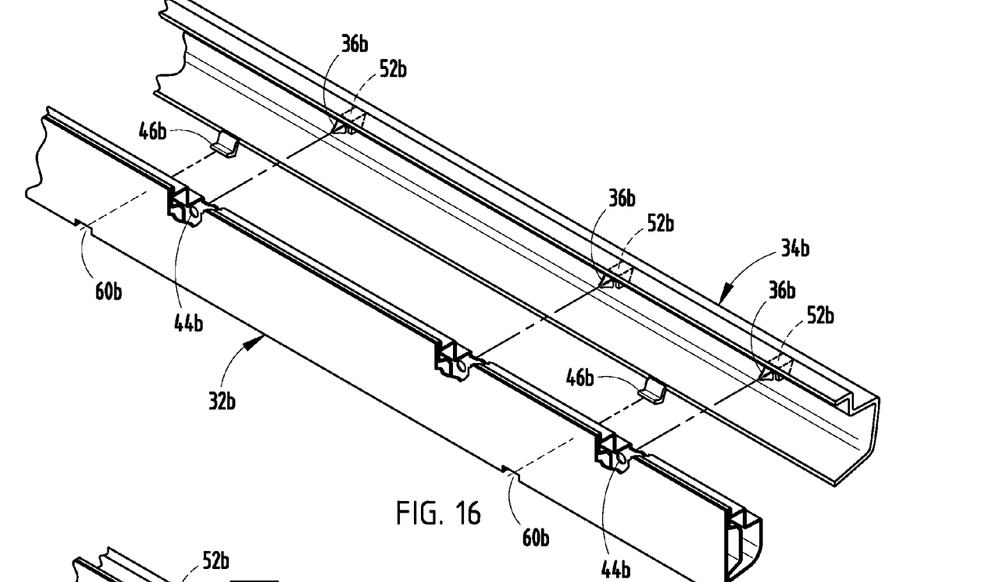
FIG. 16 is a top exploded assembly view of a vehicle panel being covered by a trim component according to a third embodiment.
Figure 16A:
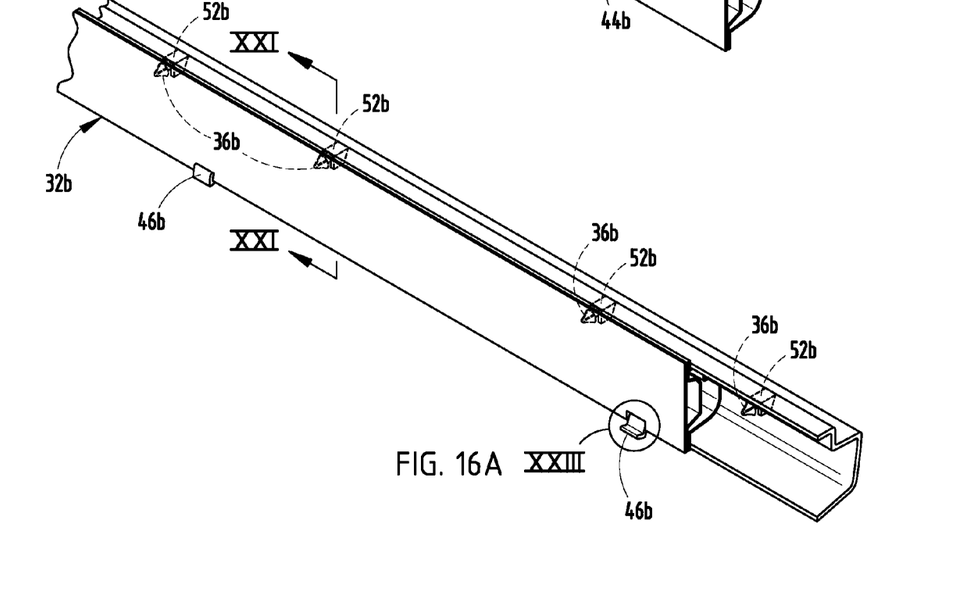
FIG. 16A is a top perspective view of the trim component shown in FIG. 16 aligned prior to engagement and covering of the vehicle panel.
Figure 17:
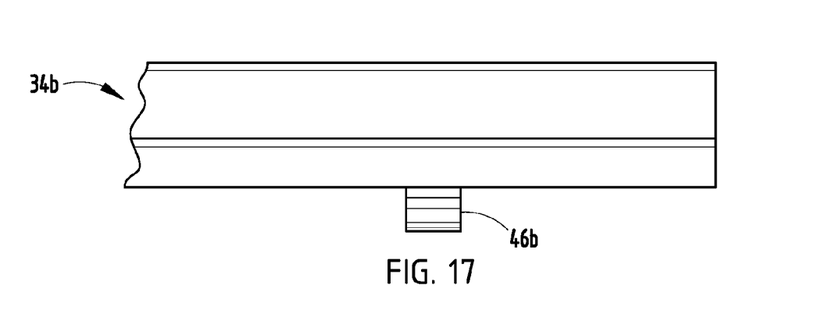
FIG. 17 is an elevational top view of the trim component shown in FIG. 16.
Figure 18:
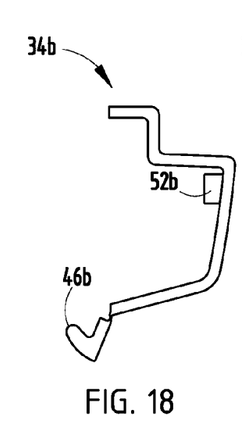
FIG. 18 is an elevational end view of the trim component shown in FIG. 16.
Figure 19:
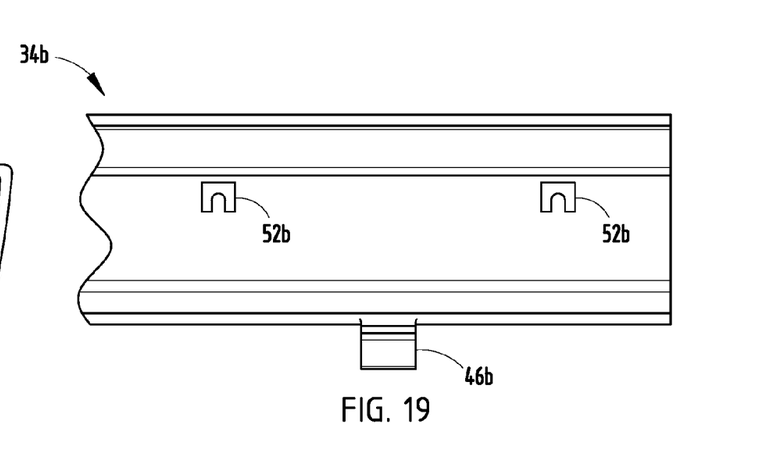
FIG. 19 is an elevational front view of the trim component shown in FIG. 16.
Figure 20:
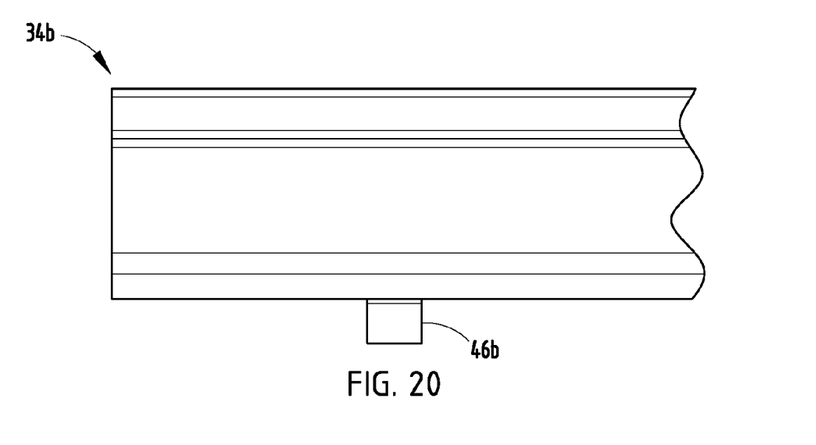
FIG. 20 is an elevational rear view of the trim component shown in FIG. 16.
Figure 21:
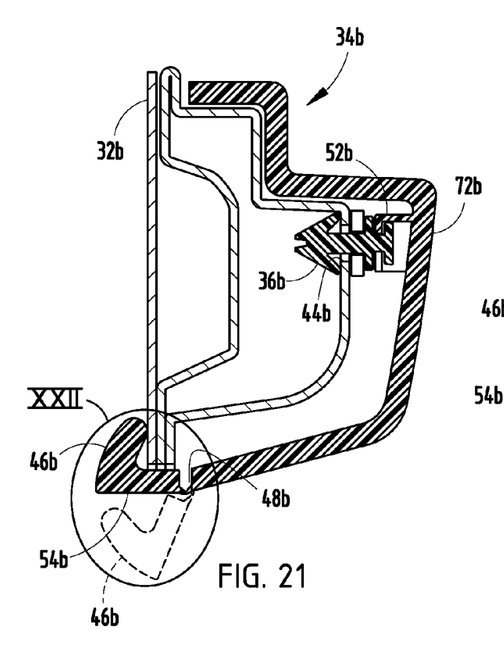
FIG. 21 is a cross-sectional view taken at line XXI-XXI of FIG. 16A showing the rotatable flap that secures the trim component to the vehicle panel.
Figure 22:
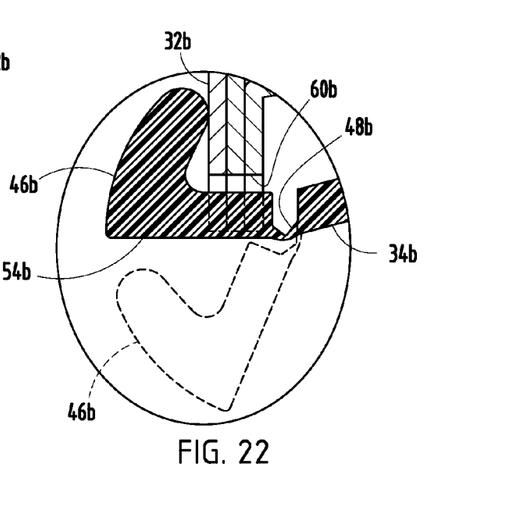
FIG. 22 is an enlarged view of section XXII of FIG. 21 further illustrating the rotatable flap of the trim component in an engaged and non-engaged position.
Figure 23:
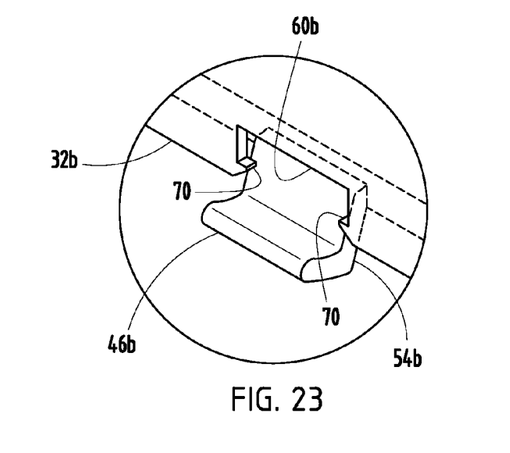
FIG. 23 is an enlarged view of section XXIII-XXIII of FIG. 16A further illustrating the rotatable flap of a trim component in a non-engaged position.

Each secondary fastener 46a is located along the lower edge of the trim body 72a and projects outwardly. The secondary fastener 46a is rotatably connected to the trim body 72a and, similar to the first embodiment, is made of a material having sufficient resiliency to regain its original position subsequent to engagement of the vehicle panel 32a. Each secondary fastener 46a has an angled or rounded cam surface 64 at an outer location and is configured to slide into the notch 60 in the lower edge of the vehicle panel 32a. Deformation of each secondary fastener 46a occurs until the lower edge of panel 32a completely slides over the cam surface 64. Similar to the previous embodiment, the secondary fastener 46a has a channel 58a that is configured to receive and retain the lower edge portion of the vehicle panel 32a, thereby providing additional security for the engagement between the trim component 34a and the vehicle panel 32a. FIG. 14 illustrates complete engagement of the trim component 34a to a vehicle panel 32a and FIG. 15 further illustrates the engagement of the secondary fastener 46a.

Referring to FIGS. 16-23, a vehicle trim component 34b is illustrated according to a third embodiment connected to a body panel 32b of a vehicle. In this embodiment, the vehicle trim component 34b has a trim body 72b and primary fasteners 36b that connect to body panel 32b the same or similar to the primary fasteners 36 described in the first embodiment. Since vehicle trim component 34b is similar to the previously-described vehicle trim component 34, similar parts appearing in FIGS. 2-8 and FIGS. 16-23, respectively, are represented by the same corresponding reference number, except for the suffix "b" in the numerals of the latter.

In the illustrated third embodiment, the trim component 34b has a plurality of housings 52b and primary fasteners 36b, configured and aligned, similar to that of the previously-described vehicle trim component 34b for a vehicle. The illustrated vehicle panel 32b has notches 60b located along the lower edge of the body panel 32b. The notches 60b are configured to receive and engage the flaps 54b of the trim component 34b which serve as secondary fasteners 46b.

As shown, each secondary fastener 46b is located along a lower edge of the trim body 72b, each secondary fastener 46b is rotatably connected to the trim body 72b by a living hinge 48b that allows the flap 54b to obtain a secure and unsecure position. Once the flaps 54b are aligned with each notch 60b along the lower edge of the vehicle panel 32b, the flaps 54b can be flipped upwards to snap into a secure position by engaging opposing detents 70 formed in the sidewalls of notches 60b.

Accordingly, the vehicle trim component advantageously provides for a more secure and stable attachment of the trim component to a vehicle, thereby reducing vibration of the trim component while the vehicle is in motion. As a result, a reduction in noise is accomplished, providing a more pleasurable driving experience. Additionally, the attachment to an outer portion of the vehicle panel eliminates the problem associated with clogging of apertures located at lower regions of the vehicle base.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A trim component for a vehicle panel comprising:
a body having an upper portion, a lower portion, and a bottom edge;
a primary fastener comprising a projection having a first end configured to project through and engage an aperture in the panel a second end connected to the upper portion of the body; and
a secondary fastener comprising a non-intrusive engagement member extending from the lower portion of the body fully above the bottom edge, wherein the engagement member includes a head with a U-shaped channel configured to engage an exterior portion of the panel and a neck connecting the head to the body, and wherein the neck is thinner than the head and is hingedly connected to the lower portion of the body.

2. The trim component of claim 1, wherein the trim component is made of plastic.

3. The trim component of claim 1, wherein the trim component is made of a moldable material.

4. The vehicle trim component of claim 1, wherein the channel is capable of alignment substantially parallel to the exterior portion of the panel and configured to securely retain the panel, and wherein the hinged connection between the neck of the engagement member and the lower portion of the body comprises a living hinge.

5. The trim component of claim 1, wherein the trim component has a plurality of primary fasteners and a plurality of secondary fasteners.

6. The trim component of claim 1, wherein the head includes an angled face to provide adequate resiliency to securely attach the trim component to the panel.

7. The trim component of claim 1, wherein the first end of the projection is a push clip that extends outwardly, such that the push clip is configured to extend outwardly subsequent to entering the aperture to securely attach the trim component to the panel.

8. A trim component for a vehicle panel comprising:
a body;
a primary fastener extending from the body and including a push-clip head configured to engage an aperture in the panel; and
a non-intrusive secondary fastener including an engagement arm with a first end hingedly connected to the body fully above a bottom edge of the body and a second end having a U-shaped channel for engaging an exterior edge of the panel.

9. The trim component of claim 8, wherein the trim component is made of plastic.

10. The trim component of claim 8, wherein the trim component is made of a moldable material.

11. The trim component of claim 8, wherein the trim component has a plurality of primary fasteners and a plurality of secondary fasteners.

12. The trim component of claim 8, wherein the channel is configured to align substantially parallel to the exterior edge of the panel to securely retain trim component to the panel.

13. The trim component of claim 12, wherein the exterior edge of the panel is a flange configured to substantially fit into the channel.

14. The trim component of claim 8, wherein the push clip extends outwardly, such that the push clip is configured to extend outwardly subsequent to entering the aperture to securely attach the trim component to the panel.

15. A method for covering a panel of a vehicle comprising the steps of:
forming an aperture in the panel;
providing a trim component for attachment to the panel, the trim component including a body, a primary fastener extending from an upper portion of the body, and a secondary fastener extending from a lower portion of the body fully above a bottom edge of the body, wherein the primary fastener includes a first end with a push-clip head and a second end connected to the body, and wherein the secondary fastener includes a non-intrusive engagement member with a head configured to engaged an exterior edge of the panel and a neck connecting the head to the body;

attaching the upper portion of the body of the trim component to the panel by inserting the push-clip head of the primary fastener within the aperture in the panel; and attaching the lower portion of the body of the trim component to the panel by engaging a channel formed on the head of the secondary fastener with the exterior edge of the panel, wherein the neck of the secondary fastener is hingedly connected to the lower portion of the body by a living hinge.

16. A method according to claim 15, wherein the trim component is made of plastic.

17. A method according to claim 15, wherein the trim component is made of a moldable material.

18. A method according to claim 15, wherein the trim component has a plurality of primary fasteners and a plurality of secondary fasteners.

19. A method according to claim 15, wherein the the channel is configured to align substantially parallel to the exterior edge of the panel to securely retain the panel.

20. A method according to claim 19, wherein the exterior edge of the panel is a flange configured to substantially fit into the channel.

* * * * *